United States Patent [19]

Ohara et al.

[11] Patent Number: 4,788,097
[45] Date of Patent: Nov. 29, 1988

[54] INFORMATION RECORDING MEDIUM

[75] Inventors: Shinichiro Ohara; Masao Yabe; Younosuke Takahashi, all of Fujinomiya, Japan

[73] Assignee: Fuji Photo Film Co., Ltd., Japan

[21] Appl. No.: 13,814

[22] Filed: Feb. 12, 1987

[30] Foreign Application Priority Data

| Feb. 12, 1986 | [JP] | Japan | 61-28241 |
| Mar. 20, 1986 | [JP] | Japan | 61-64567 |
| Mar. 26, 1986 | [JP] | Japan | 61-69070 |
| Mar. 26, 1986 | [JP] | Japan | 61-69071 |

[51] Int. Cl.$^4$ .......................... G01D 15/14; B32B 3/00
[52] U.S. Cl. .......................... 428/201; 428/64; 430/270; 430/495; 430/945; 346/135.1
[58] Field of Search ............... 428/201, 457, 463, 688, 428/689; 430/270, 945, 495; 346/135.1, 137

[56] References Cited

U.S. PATENT DOCUMENTS

| 4,291,119 | 9/1981 | Kido et al. | 430/495 |
| 4,451,914 | 5/1984 | LaBudde et al. | 346/135.1 |
| 4,477,555 | 10/1984 | Oba et al. | 346/135.1 |
| 4,500,889 | 2/1985 | Wada et al. | 430/945 |

FOREIGN PATENT DOCUMENTS

| 0045183 | 2/1982 | European Pat. Off. | 346/135.1 |
| 2558529 | 7/1976 | Fed. Rep. of Germany . | |
| 0189894 | 11/1982 | Japan | 430/945 |
| 2029266 | 3/1980 | United Kingdom | 430/945 |

OTHER PUBLICATIONS

IBM Technical Disclosure Bulletin, vol. 25, No. 8, 1/83.

*Primary Examiner*—John E. Kittle
*Assistant Examiner*—B. A. Bozzelli
*Attorney, Agent, or Firm*—Gerald J. Ferguson, Jr.

[57] ABSTRACT

An information recording medium including a substrate, an optional intermediate layer arranged on the substrate, and a recording layer arranged on the intermediate layer on the substrate, the recording layer including a low melting metal selected from the group consisting of In, Te, Sn, Pb and Bi and a metal compound selected from a metal sulfide, a metal fluoride and a metal oxide. The recording layer further contains a metal having a high surface tension of not less than 600 dyne/cm within temperatures from its melting point to a temperature higher than the melting point by 300° C., the concentrations of the metal varying along the depth direction of the recording layer in such manner that the concentration of the metal on the side facing the substrate is higher than that of the metal on the opposite side where the metal on the side facing the substrate may be in the form of islands. The intermediate layer includes a compound selected from the group consisting of a chlorinated polyolefin, a polymer material having a thermal decomposition temperature of not higher than 300° C., and an organic compound having a surface energy of not higher than 40 dyne/cm$^2$.

16 Claims, 2 Drawing Sheets

INFORMATION RECORDING MEDIUM

BACKGROUND OF THE INVENTION

1. Field of the Invention

This invention relates to an information recording medium, and more particularly to an improvement of a information recording medium for writing and/or reading information by means of laser beam of high energy density.

2. Description of Prior Arts

Information recording media utilizing a beam of high energy density such as laser beam have been developed in recent years and are put to practical use. Such recording medium is generally called "optical disc", and the practical applications thereof have been found, for example, as video disc and audio disc as well as disc memory for large-capacity computer and large-capacity static image file.

Writing of information on the optical disc can be conducted, for example, by irradiating the optical disc with a laser beam. Under irradiation with the laser beam, the irradiated area of the recording layer of the optical disc absorbs the energy of beam, accordingly rise of temperature locally occurs and as a result the recording layer is removed through evaporation or fusion on the area having received the irradiation, whereby the recording of information can be made. Reading of information from the optical disc is also conducted by irradiating the optical disc with laser beam. The information can be reproduced by detecting reflected light or transmitted light corresponding to the alteration in the optical characteristics of the recording layer.

The optical disc generally comprises a disc-shaped transparent substrate of a plastic or glass material and a recording layer composed of a metal or a semi-metal such as Bi, Sn, In or Te which is provided on the substrate.

Between the substrate and the recording layer, a subbing layer or an intermediated layer of a polymer material may be arranged so that the adhesion between the substrate and recording layer, is ensured and the sensitivity of the optical disc is enhanced.

Since the information recording medium is of great value for utilization in various fields of art as mentioned hereinbefore, its sensitivity preferably is as high as possible.

Certain improvements for enhancement of the recording sensitivity have been previously reported: for example, Japanese Patent Publication No. 59(1984)-34519 discloses a laminated composite structure such as a composite of a metal film and PbO, metal fluoride or In-Ge-S chalcogen compound; Japanese Patent Publication No. 58(1983)-33120 discloses a layer comprising a mixture of a metal and GeS; and Japanese Patent Publication No. 58(1983)-15319 discloses a layer comprising a mixture of a metal and a metal fluoride such as $MgF_2$ or a metal oxide such as $MoO_2$.

In these recording media, it is sometimes observed that no pits were formed on the recording layer when a laser beam is applied thereon. The reason appears that while the output energy of the laser beam is sufficient for fusing the recording layer, the fused portion of the recording layer is not well drawn toward the circumferential side for forming a pit and solidifies still in the original fused area. Such recording medium is not satisfactory in the sensitivity, and therefore the output of the laser beam is necessarily increased. Further, in the stage of reading the information recorded in the recording layer, poorly or imcompletely pits sometimes give unfavorable errors in the reproduction of the recorded information.

For improvement of the conventional information recording medium such as enhancement of sensitivity and reduction of the reproduction error, the present inventors have already invented an information recording medium having recording layer which comprises a combination on In and at least one metal compound such as a metal sulfide, a metal fluoride or metal oxide and further contains a metal showing a surface tension of not less than 600 dyne/cm within temperatures of the melting point thereof to a temperature higher than the melting point by 300° C., wherein the concentration of said metal advantageously varying along depth direction of the recording layer in such manner that the concentration of said metal on the side facing the substrate is higher than that of said metal on the opposite side. This invention is disclosed in U.S. patent application Ser. No. 868,126. This recording medium shows enhanced C/N ratio (ratio of carrier/noise) at a low laser output and further shows decreased reproduction error (B.E.R., Bit Error Rate).

SUMMARY OF THE INVENTION

It is an object of the present invention to provide a recording medium which is enhanced in the recording sensitivity.

It is another object of the invention to provide a recording medium showing less bit error rate (B.E.R.).

It is a further object of the invention to provide a recording medium stably showing less bit error rate (B.E.R.) even after storage of a long time of period.

In the first aspect, the present invention resides in the improvement of an information recording medium comprising a substrate, an intermediate layer arranged on the substrate, and a recording layer arranged on the intermediate layer, said recording layer comprising a low melting metal selected from the group consisting of In, Te, Sn, Pb and Bi and a metal compound selected from a metal sulfide, a metal fluoride and a metal oxide, wherein:

the recording layer further contains a metal having a high surface tension of not less than 600 dyne/cm within temperatures from its melting point to a temperature higher than the melting point by 300° C., the concentration of said metal varying along the depth direction of the recording layer in such manner that the concentration of said metal on the side facing the substrate is higher than that of said metal on the opposite side, and the intermediate layer comprises a compound selected from the group consisting of a chlorinated polyolefin, a polymer material having a thermal decomposition temperature of not higher than 300° C., and an organic compound having a surface energy of not higher than 40 dyne/cm².

The information recording medium of the above-mentioned invention is provided with a recording layer containing a metal of a high surface tension in such a manner that the concentration of the metal increases in the recording layer along the depth direction from the surface not facing the substrate to the surface facing the substrate, and an intermediate layer of a specific compound such as chlorinated polyolefin which is arranged between the substrate and the recording layer. The combination of the recording layer containing a metal of a high surface tension at an increased concentration on the substrate side and the intermediate layer of the specific material which assists the movement of fused portion of the recording layer toward the circumferential non-fused area through a low surface energy or which is removed easily upon receipt of thermal energty through decomposition is prominently effective to easily and precisely form a pit in the recording layer. Therefore, the above-mentioned information recording medium shows a high C/N ratio at a low laser output energy, and thus shows a prominently higher sensitivity than the conventional information recording disc.

Further, the above-mentioned information recording medium stably shows less bit error rate even after storage of a long time of period.

In the second aspect, the present invention further provides an improvment of an information recording medium comprising a substrate and a recording layer arranged on the substrate, said recording layer comprising a low melting metal selected from the group consisting of In, Te, Sn, Pb and Bi and a metal compound selected from a metal sulfide, a metal fluoride and a metal oxide, wherein:

the recording layer further contains a metal having a high surface tension of not less than 600 dyne/cm within temperatures from its melting point to a temperature higher than the melting point by 300° C., said metal being arranged in the form of islands on the surface facing the substrate.

The information recording medium of this invention is provided with a recording layer containing a metal of a high surface tension which is arranged in the form of islands such as dots on the surface facing the substrate. The arrangement of the metal of high surface tension in the form of islands is advantageous, because the metal islands are relatively insulated thermally from each other and accordingly thermal loss from each island due to thermal conduction is minimized. This means that the recording layer shows enhanced recording sensitivity. The enhancement of sensitivity is further increased by providing an intermediate layer between the substrate and the recording layer. From the viewpoint of effective increase of the sensitivity, an intermediate layer comprising a chlorinated polyolefin is preferred.

Therefore, the latter-mentioned information recording medium also shows a high C/N ratio at a low laser output energy, and thus shows a prominently higher sensitivity than the conventional information recording disc.

Further, the latter-mentioned information recording medium also stably shows less bit error rate even after storage of a long time of period.

PREFERRED EMBODIMENTS OF THE INVENTION

Figure 1:
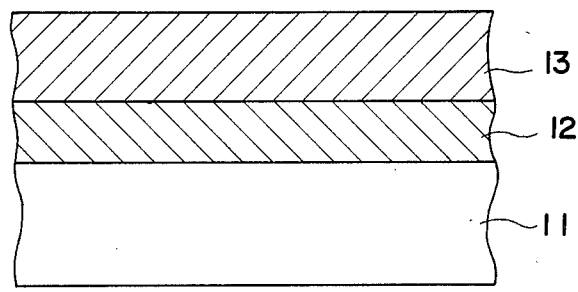
FIG. 1 shows a schematical view of an constitution of the layers of the information recording medium of the present invention.

The representative constitution of the layers of the recording medium according to the first embodiment of the present invention is illustrated in FIG. 1 wherein the recording medium comprises a substrate 11, an intermediate layer 12, and a recording layer 13. A protective layer may be arranged on the recording layer 13.

The recording medium according to the first embodiment of the present invention can be prepared, for example, in the following manner.

The substrate material employed in the invention can be selected from any materials which have been employed as the substrates of the conventional recording media. From the viewpoint of optical characteristics, smoothness, workability, handling properties, long-term stability and manufacturing cost, preferable examples of the substrate material include glass such as tempered glass, acrylic resins such as cell-cast polymethyl methacrylate and injection-molded polymethyl methacrylate; vinyl chloride resins such as polyvinyl chloride and vinyl chloride copolymer; polycarbonate resins; and epoxy resins. Among these materials, glass, epoxy resin, acrylic resins and polycarbonate resins are preferred.

The surface of the substrate on which a recording layer is placed may be provided with a subbing layer for the purpose of improving smoothness, adhesion to the recording layer and sensitivity by heat insulating and preventing the recording layer from being denatured. Examples of material employable for the preparation of the subbing layer include an inorganic oxide such as $SiO_2$ or $Al_2O_3$, an inorganic fluoride such as $MgF_2$ or a silane-coupling agent.

Further, a pregroove layer for assisting tracking may be provided on or under the subbing layer. The tracking groove may be formed on the substrate.

The characteristic intermediate layer of the invention comprises a compound selected from the group consisting of a chlorinated polyolefin, a polymer material having a thermal decomposition temperature of not higher than 300° C., and an organic compound having a surface energy of not higher than 40 dyne/cm$^2$. This intermediate layer can replace the above-mentioned subbing layer. Otherwise, this intermediate layer can be arranged on the subbing layer.

The chlorinated polyolefin employable in the invention has chlorination ratio of not less than 30%., preferably not less than 50%, more preferably in the range of 50 to 70%. The chlorination ratio means a value of a molar amount of substituent chlorine atom per a molar amount of hydrogen atom of an original (i.e., unsubstituted) polyolefin.

Among the chlorinated polyolefins, particularly preferred are chlorinated polyethylene and chlorinated polypropylene from the viewpoints of heat-stability and solubility.

The chlorinated polyolefin layer can be formed on the substrate by dissolving the above-mentioned chlorinated polyolefin in an appropriate solvent to prepare a coating solution, and applying the coating solution onto the substrate.

Examples of the solvent for dissolving the chlorinated polyolefin include toluene, xylene, ethyl acetate, butyl acetate, cellusolve acetate, methyl ethyl ketone, 1,2-dichloroethane, methyl isobutyl ketone, cyclohexane, cyclohexanone, tetrahydrofuran, diethyl ether, and dioxane.

The coating solution for the formation of a chlorinated polyolefin layer may further contain other additives such as a plasticizer and a lubricant according to the purpose.

The coating solution can be applied onto the substrate by a conventional coating method such as spray coating, spin coating, dip coating, roll coating, blade coating, doctor roll coating or screen printing.

The substrate (or undercoating layer) having a layer of the coating solution thereon is dried to form a chlorinated polyolefin layer on the substrate. The thickness of the chlorinated polyolefin layer is preferably in the range of 50 to 1,000 angstroms, more preferably in the range of 100 to 300 angstroms.

The chlorinated polyolefin layer can contain a heat stabilizer for imparting to the chlorinated polyolefin resistance to heat. Examples of the heat stabilizer include epoxy compounds, basic lead salts, organic tin compounds and stearic acid salt. Representative examples of the heat stabilizers are allyl glycidyl ether, ethyl glycidyl ether, phenyl glycidyl ether, epoxy compounds having two or more epoxy groups in the molecule, dibasic lead phosphite, dibasic lead carbonate, dibasic lead stearate, tribasic lead maleate, dialkyl tins (e.g., dimethyl tin, diethyl tin), diaryl tins (e.g., diphenyl tin, di-p-tolyl tin, di-p-xylyltin tin), tetraalkyl tins (e.g., tetramethyl tin, tetraethyl tin), tetraaryl tins (e.g., tetraphenyl tin), dialkyl tin maleate, cadmium stearate, magnesium stearate, aluminum stearate, barium stearate, and lead stearate. The heat stabilizer can be contained in an amount of not more than 10 wt.%, preferably 0.5 to 3 wt.% based on the abount of the chlorinated polyolefin.

Examples of the polymer material having a thermal decomposition temperature of not higher than 300° C., include ionomer resin, ipsane resin, acrylonitrile-acrylic acid-styrene resin, acrylonitrile-butadiene-styrene resin, ethylene-vinyl chloride resin, ethylene-vinyl acetate-vinyl chloride grafted resin, ethylene-vinyl acetate resin, ethylene-tetrachloroethylene resin, epoxy resin, vinylidene chloride resin, vinyl chloride resin, chlorinated polyether resin, vinyl chloride-propylene resin, xylene resin, cumarone resin, guanamine resin, ketone resin, vinyl acetate resin, silicone resin, diallyl phthalate resin, styrene-formalin resin, petroleum resin, polyethylene, vinyl ester resin, phenoxy resin, phenol resin, vinylidene fluoride resin, fluoro resin, furan resin, butyral resin, unsaturated polyester ressin, polyacetal resin, polyamide resin, polyimide resin, polyisobutylene, polyuretane resin, polyethyelene oxide, polycarbonate resin, polyglutamic acid resin, polysulfide polymer, polystyrene resin ethylene derivative resin, polysulfone resin, polyterpene resin, polyvinyl alcohol, polyvinyl ether, polyvinyl carbazole, polyvinyl toluene, polyvinyl formal, polyphenylene oxide, polypropylene resin, polybutylene terephthalate, polybutene, acrylic resin, methacylic resin, melamine resin, urea resin, resolcinol resin, ethyl cellulose, acetyl cellulose, carboxymethyl cellulose, nitrocellulose, hydroxyethylcellulose, methylcellulose, styrene-butadine rubber, polybutadiene rubber, polyisoprene rubber, acrylonitrile-butadined rubber, and chloroprene rubber.

The organic compound having a surface energy of not higher than 40 dyne/cm$^2$ can be a polymer of a compound having a low molecular weight. Examples of such polymers include graft polymers containing fluorine atoms and/or silicon atoms, and plasma polymerization products of silicon atom-containing monomers. The graft polymers containing fluorine atoms and/or silicon atoms are composed of a skeleton polymer such as polyalkyl(meth)acrylate, polybutadiene of ethylene-vinyl acetate copolymer and a branch polymer such as polyalkyl(meth)acrylate, polyacrylonitrile or polystyrene. The fluorine atoms and/or silicone atoms may be contained either of the skeleton polymer or the branch polymer. The graft polymer can have a molecular weight ranging from 1,000 to 100,000. The graft polymer is soluble in an organic solvent. Examples of the compound having a low molecular weight include higher aliphatic carboxylic acids having 11-21 carbon atoms, their ester, their amides, their metal salts, aromatic or aliphatic esters of phosphoric acid containing 11-21 carbon atoms, sulfur-containing compounds having the formula $S(CH_2CH_2COOR)_2$ wherein R is an alkyl or phenyl group), higher aliphatic alcohol, and higher aliphatic isocyanate. Preferred are higher aliphatic carboxylic acids having 11-21 carbon atoms, their ester, their amides, their metal salts, and aromatic or aliphatic esters of phosphoric acid containing 11-21 carbon atoms. The polymer and the low molecular weight compound may be employed singly or in combination.

The above-described materials for the formation of the intermediate layer other than the chlorinated polyolefin can be coated on the substrate or a subbing layer in the form of a solution in an organic solvent. Examples of the solvents include methanol, ethanol, propanol, butanol, acetone, methyl ethyl ketone, methyl isobutyl ketone, diacetone alcohol, methylcellosolve, ethylcellosolve, butylcellosolve, methylcellosolve acetate, ethylcellosolve acetate, dimethylformamide, thiner, toluene, xylene, ethyl acetate, butyl acetate, 1,2-dichloroethane, cyclohexanone, cyclohexane, tetrahydrofuran, diethyl ether and dioxane.

The coating solution may further contain other additives such as a plasticizer and a lubricant according to the purpose.

The coating solution can be applied onto the substrate by a conventional coating method such as spray coating, spin coating, dip coating, roll coating, blade coating, doctor roll coating or screen printing.

The substrate (or undercoating layer) having a layer of the coating solution thereon is dried to form the desired intermediate layer on the substrate. The thickness of the intermediate is preferably in the range of 50 to 10,0000 angstroms, more preferably 50 to 1,000 angstroms.

On the surface of the intermediate layer such as the chlorinated polyolefin layer, a recording layer is then formed.

The recording layer of the recording medium of the inventin comprises a low melting metal selected from the group consisting of In, Te, Sn, Pb and Bi and a metal compound selected from a metal sulfide, a metal fluoride and a metal oxide, and further contains a metal having a high surface tension of not less than 600 dyne/cm within temperatures from its melting point to a temperature higher than the melting point by 300° C., the concentration of said metal varying along the depth direction of the recording layer in such manner that the concentration of said metal on the side facing the substrate is higher than that of said metal on the opposite side.

Examples of the metal sulfides employable in the invention include CrS, $Cr_2S$, $Cr_2S_3$, $MoS_2$, MnS, FeS, $FeS_2$, CoS, $Co_2S_3$, NiS, $Ni_2S$, PbS, $Cu_2S$, $Ag_2S$, ZnS, $In_2S_3$, $In_2S_2$, GeS, $GeS_x$ ($0.5-x \leqq 2.0$), SnS, $SnS_2$, $As_2S_3$, $Sb_2S_3$ and $Bi_2S_3$.

Examples of the metal fluorides employable in the invention include $MgF_2$, $CaF_2$ and $RhF_3$.

Examples of the metal oxides employable in the invention include $In_2O$, $In_2O_3$, PbO and $MoO_2$.

Preferred are GeS, GeO, SnS, $In_2O_3$ and $In_2S_3$.

Examples of the metals showing a surface tension of not less than 600 dyne/cm within temperatures of melting point thereof to a temperature higher than the melting point by 300° C. include the following metals: Ag, Al, Co, Cu, Ga, Mo, Ni, Si, V, Au, Be, Cr, Fe, Mn, Nb, Pd, Ti and Zn.

The recording layer contains the low-melting point metal preferably in an amount from 30 to 80%, more preferably 50 to 80%, by weight of the recording layer.

The recording layer contains the aforementioned metal compound preferably in an amount of from 10 to 50%, more preferably from 30 to 50%, by weight of the recording layer.

The recording layer contains the above-mentioned metal having a high surface tension preferably in an amount ranging from 0.1 to 30%, more preferably from 1 to 15%, by weight of the recording layer.

The recording layer can be formed on the intermediate layer using the above-mentioned material by means of metallizing, sputtering or ion plating process. For providing concentration gradient of the components in the recording layer, the amount of the components is relatively varied in the preparation stage of the recording layer such as metallizing. The recording layer may be composed of a single layer or plural layers. The thickness of the recording layer is generally in the range of 100 to 5,500 angstroms from the viewpoint of optical density required for the optical recording.

Figure 2:
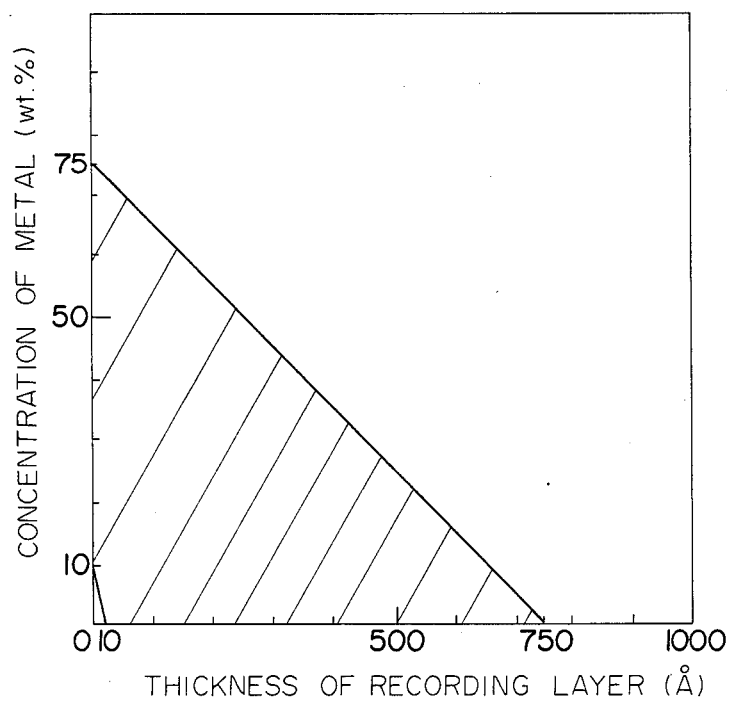
FIG. 2 is a graph showing gradient of the concentration of a metal of high surface tension wherein the thickness (or depth) of the recording layer from the surface facing the substrate is given on the abscissa, and the concentration of the metal is given on the ordinate.

For instance, where the recording layer of the invention has thickness of 1,000 angstroms, the gradient of concentration of the metal of high surface tension is included in the hatched area in FIG. 2. FIG. 2 is a graph wherein the thickness (or depth) of the recording layer from the surface facing the substrate is given on the abscissa, and the concentration of the metal is given on the ordinate. Accordingly, the left end at thickness of 0 angstrom means the surface facing the substrate, and the right end at thickness of 1,000 angstroms means the sruface facing the recording layer. The concentration of the metal means a ratio by weight of the metal present on the section which is formed by cutting the recording layer at a uniform depth level. The metal of high surface tension is preferably contained in the recording layer on the surface facing the substrate in an amount of 10 to 75 wt.%.

A thin film of an inorganic material such as silicon dioxide, tin oxide or manganese fluoride may be formed on the free surface of the substrate (the surface not facing the recording layer) by means of vacuum metallizing or sputtering process in order to increase resistance to damage and moisture proofness.

The information recording medium of the present invention can be constituted as a single substrate type, an air sandwich type using two substrate, or a laminated type whrein the recording laye is covered with another substrate.

Figure 3:
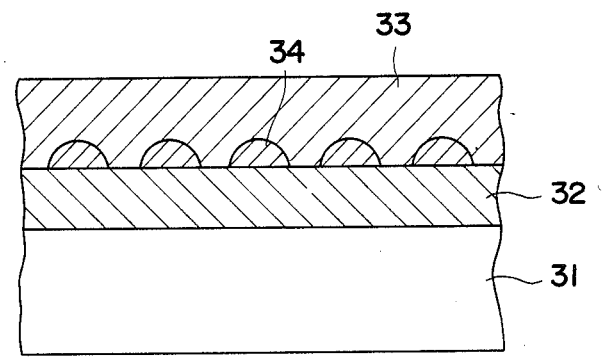
FIG. 3 shows a schematical view of another constitution of the layers of the information recording medium of the present invention.

The representative constitution of the layers of the recording medium according to the second embodiment of the present invention is illustrated in FIG. 3 wherein the recording medium comprises a substrate 31, an intermediate layer 32, and a recording layer 33. In the recording layer 33, islands 34 of the metal of high surface tension are arranged. A protective layer may be arranged on the recording layer 33.

Figure 4:
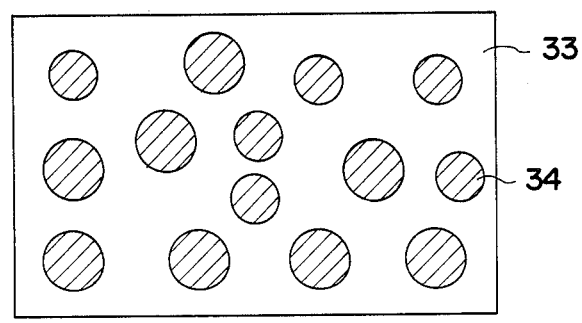
FIG. 4 is a plain view of the recording layer of the recording medium of FIG. 3 showing the arrangement of the islands.

FIG. 4 is a plain view of the recording layer 33 showing the arrangement of the islands 34.

Figure 5:
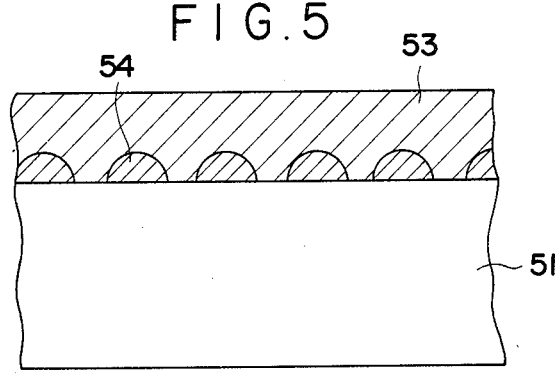
FIG. 5 shows a schematical view of a further constitution of the layers of the information recording medium of the present invention.

Another representative constitution of the layers of the recording medium according to the second embodiment of the invention is illustrated in FIG. 5 wherein the recording medium comprises a substrate 51 and a recording layer 53. In the recording layer 53, islands 54 of the metal of high surface tension are arranged. A protective layer may be arranged on the recording layer 53.

The recording medium according to the second embodiment of the present invention can be prepared, for example, in the following manner.

The substrate material described hereinbefore for the first embodiment can be employed in the second embodiment.

On the substrate was optionally arranged an intermediate layer (or subbing layer) of a known material. Preferably, the intermediate layer described hereinbefore for the first embodiment is formed for further enhancement of the sensitivity of the recording layer and improvement of other properties.

On the substrate or the intermediate layer was formed the recording layer. The recording layer of the second embodiment is the same as the recording layer of the first embodiment except that the metal of high surface tensin is arranged in the form of islands such as dots on the surface facing the substrate (or intermediate layer). The recording layer having such islands can be formed by first forming islands of the metal on the substrate or the intermediate layer by sputtering, vaporization, ion-plating or other metallizing process, and then forming the layer of other recording materials over the metal in the form of islands.

The islands of the metal having high surface tension are preferably in the form of dots having a mean diameter of 20 to 500 angstroms and distances between adjoining dots ranges from 50 to 1,000 angstroms.

The present invention is further illustrated by the following examples. In the examples, the "part(s)" means "part(s) by weight", unless otherwise indicated.

EXAMPLE 1

On a disc-shaped polycarbonate substrate (outer diameter: 130 mm, inner diameter: 15 mm, thickness 1.2 mm) was coated a coating solution having the following composition by spin coating.

—$(C_2H_{4-y}Cl_y)_n$ (chlorinated polyethylene, y=1.7, n=200): 0.2 part

Methyl ethyl ketone: 10 parts cyclohexane: 100 parts

The coated layer was dried to form a chlorinated polyethylene layer having thickness of 150 angstroms on the substrate.

On the chlorinated polyethylene layer was subsequently co-deposited Sn, Au and SnS in the amount of 65 wt.%, 5 wt.% and 30 wt.%, respectively, to form a recording layer having the thickness of 1,000 angstroms. In this deposition, voltage of the electric current given to the evaporation source of Au was controlled in such a manner that the concentration of Au would be higher on the substrate-side and become lower on the exposed surface of the recording layer. Thus formed recording layer contains Au on the surface facing the substrate in an amount of 40 wt.%.

Thus, a recording medium according to the invention comprising a substrate, a chlorinated polyethylene layer, and the recording layer superposed on the substrate was prepared.

COMPARISON EXAMPLE 1

The procedure of Example 1 was repeated for the formation of a chlorinated polyethylene layer on the substrate.

On the chlorinated polyethylene layer was first formed of Au layer by vaporation, and on the Au layer were co-deposited Sn and SnS to form a Sn-SnS layer. Thus, a Au layer and a Sn-SnS layer were superposed to form a double recording layer on the substrate in order. In the double recording layer, the ratio of the amounts of Au, Sn and SnS was 5 wt.%, 65 wt.% and 30 wt.%, respectively, and the total thickness of the double recording layer was 1,000 angstroms.

Thus, a recording medium comprising a substrate, a chlorinated polyethylene layer, and the double recording layer superposed on the substrate was prepared.

COMPARISON EXAMPLE 2

The procedures of Example 1 were repeated except for not providing a chlorinated polyethylene layer on the substrate.

Thus, a recording medium comprising a substrate and a recording layer arranged on the substrate was prepared.

Evaluation of Recording Medium (1) Test for sensitivity

The recording media prepared in Example and Comparison Examples were evaluated: (a) at the time just after the production of the recording medium was complete; and (b) after storage of the recording medium in a thermostat maintained at 60° C., 90%RH for 30 days. The evaluation was performed by recording binary value information on the recording medium at linear rate of 5 m/sec, and the laser output where the C/N ratio (i.e., ratio of the output level between carrier and noise) reached to the maximum value, and the C/N ratio measured at such laser output was determined.

(2) Test for bit error rate

The recording medium having a recorded information adjusted under the above conditions (a) and (b) was determined with respect to the rate of error signals in the reproduction signals (i.e., bit error rate, BER) using a Nakamichi Disv Evaluating Device (OMS-1000). The detemination was performed at band width of 10 KHz using a spectral analyzer, on the recording medium containing information recorded at output of 7 mW.

The results are set forth in Table 1.

TABLE 1

| | Recording Power (mW) | C/N (dB) | B.E.R. (a) | B.E.R. (b) |
|---|---|---|---|---|
| Example 1 | 7 | 50 | $10^{-5}$ | $10^{-5}$ |
| Com. Ex. 1 | 8 | 50 | $10^{-4}$ | $10^{-2}$ |

TABLE 1-continued

| | Recording Power (mW) | C/N (dB) | B.E.R. (a) | B.E.R. (b) |
|---|---|---|---|---|
| Com. Ex. 2 | 9 | 50 | $10^{-2}$ | $10^{-2}$ |

As is clear from the results in Table 1, the information recording medium according to the present invention (Example 1) gave a high C/N ratio at a low recording power. Accordingly, the recording medium of the invention shows a high recording sensitivity. Further, since B.E.R. was extremely low, reduction of the reading error was confirmed. Furthermore, the recording medium of the invention showed no decrease of B.E.R. value even after the storage at 60° C., 90%RH for 30 days. Thus, high durability of the recording medium of the invention was further confirmed.

EXAMPLE 2

The procedures of Example 1 were repeated except for replacing the combination of Sn, Au and SnS with a combination of In (65 wt.%), Au (5 wt.%) and GeS (50 wt.%). Thus formed recording layer contains Au on the surface facing the substrate in an amount of 40 wt.%. The concentration of Au decresed toward the exposed surface of the recording layer.

Thus, a recording medium according to the invention comprising a substrate, a chlorinated polyethylene layer, and the recording layer superposed on the substrate was prepared.

COMPARISON EXAMPLE 3

The procedures of Comparison Example 1 were repeated except for replacing the combination of Sn and SnS with a combination of In and GeS.

Thus, a recording medium comprising a substrate, a chlorinated polyethylene layer, and the double recording layer superposed on the substrate was prepared.

COMPARISON EXAMPLE 4

The procedures of Example 2 were repeated except for replacing the combination of In, Au and GeS with a combination of In and GeS (In=55 vol.%).

Thus, a recording medium comprising a substrate, a chlorinated polyethylene layer, and a recording layer superposed on the substrate was prepared.

COMPARISON EXAMPLE 5

The procedures of Example 2 were repeated except for not providing a chlorinated polyethylene layer on the substrate.

Thus, a recording medium comprising a substrate and a recording layer arranged on the substrate was prepared.

Evaluation of Recording Medium

The recording media prepared in the above examples were evaluated with respect to the sensitivity and bit error rate in the same manner as described above, except that the determination of B.E.R. was performed on the recording medium containing information recorded at output of 5 mW.

The results are set forth in Table 2.

TABLE 2

| | Recording Power (mW) | C/N (dB) | B.E.R. (a) |
|---|---|---|---|
| Example 2 | 5 | 55 | $10^{-5}$ |

TABLE 2-continued

|  | Recording Power (mW) | C/N (dB) | B.E.R. (a) |
|---|---|---|---|
| Com. Ex. 3 | 6 | 50 | $10^{-3}$ |
| Com. Ex. 4 | 7 | 50 | $10^{-3}$ |
| Com. Ex. 5 | 7 | 55 | $10^{-2}$ |

As is clear from the results in Table 2, the information recording medium using a combination of Au, In and GeS (according to the present invention, Example 2) gave a high C/N ratio at a prominently low recording power. Accordingly, the recording medium of the invention shows an extremely high recording sensitivity. Further, since B.E.R. was extremely very low, prominent reduction of the reading error was confirmed.

EXAMPLE 3

The procedures of Example 2 were repeated except for replacing the polycarbonate substrate with an epoxy resin substrate.

Thus, a recording medium according to the invention comprising a substrate, a chlorinated polyethylene layer, and the recording layer superposed on the substrate was prepared.

EXAMPLE 4

The procedures of Example 2 were repeated except for replacing the polycarbonate substrate with a glass substrate.

Thus, a recording medium according to the invention comprising a substrate, a chlorinated polyethylene layer, and the recording layer superposed on the substrate was prepared.

Evaluation of Recording Medium

The recording media prepared in Examples 2, 3, and 4 were evaluated: (a) at the time just after the production of the recording medium was complete; and (b) after storage of the recording medium in a thermostat maintained at 60° C., 90%RH for 10 days, 30 days and 60 days. The evaluation was performed in the same manner as described hereinbefore.

The results are set forth in Table 3.

TABLE 3

|  | Example 2 | Example 3 | Example 4 |
|---|---|---|---|
| (a) Just after production |  |  |  |
| C/N ratio (dB) | 55 | 55 | 55 |
| B.E.R. | $1 \times 10^{-5}$ | $1 \times 10^{-5}$ | $1 \times 10^{-5}$ |
| (b) After 10 days |  |  |  |
| C/N ratio (dB) | 53 | 53 | 55 |
| B.E.R. | $2 \times 10^{-5}$ | $2 \times 10^{-5}$ | $2 \times 10^{-5}$ |
| (b) After 30 days |  |  |  |
| C/N ratio (dB) | 50 | 51 | 53 |
| B.E.R. | $3 \times 10^{-5}$ | $2 \times 10^{-5}$ | $2 \times 10^{-5}$ |
| (b) After 60 days |  |  |  |
| C/N ratio (dB) | 45 | 50 | 52 |
| B.E.R. | $1 \times 10^{-4}$ | $5 \times 10^{-5}$ | $3 \times 10^{-5}$ |

As is clear from the results in Table 3, the information recording medium according to the present invention (Examples 2, 3 and 4) showed little decrease of C/N ratio and B.E.R. value even after the storage at 60° C., 90%RH for 60 days. Thus, high durability of the recording medium of the invention was confirmed. The high durability of the recording medium was particularly prominent in the case using an epoxy resin substrate (Example 3) and a glass substrate (Example 4).

EXAMPLE 5

On a disc-shaped polycarbonate substrate having a pre-groove (outer diameter: 130 mm, inner diameter: 15 mm, thickness 1.2 mm, track pitch 1.6 μm) which had been produced by injection molding was coated a coating solution having the following composition by spin coating.

Polystyrene: 0.2 part
Toluene: 10 parts
cyclohexane: 100 parts

The coated layer was dried to form an intermediate layer having thickness of 0.02 μm on the substrate.

On the intermediate layer was co-deposited In, Au and GeS in the amount of 65 wt.%, 5 wt.% and 30 wt.%, respectively, to form a recording layer having the thickness of 300 angstroms. This deposition was performed in the same manner as in Example 1, whereby the concentration of Au would be higher on the substrate-side and become lower on the exposed surface of the recording layer.

Thus, a recording medium according to the invention comprising a substrate, an intemediate layer, and the recording layer superposed on the substrate was prepared.

COMPARISON EXAMPLE 6

The procedures of Example 5 were repeated except for not providing the polystyrene intermediate layer on the substrate.

Thus, a recording medium comprising a substrate and a recording layer arranged on the substrate was prepared.

Evaluation of Recording Medium

The recording media prepared in Example 5 and Comparison Example 6 were evaluated with respect to the sensitivity in the following manner.

On the recording layer of the recording medium rotating at 515 r.p.m. was recorded information by forming pits on the recording layer using a semiconductor laser (wavelength: 820 nm) under the conditions of 1.25 MHz and duty ratio 1:1. The minimum level of output of the laser when the desired pits were formed was determined. The results are set forth in Table 4.

TABLE 4

|  | Example 5 | Comparison Ex. 6 |
|---|---|---|
| Sensitivity (mW) | 6 | 8 |

As is clear from the results in Table 4, a recording medium having a recording layer wherein Au is contained with concentration of gradient increasing toward the surface facing the substrare and a polystyrene intermediate layer (according to the invention) showed higher recording sensitivity.

EXAMPLE 6

The procedures of Example 5 were repeated except for using a coating solution having the following composition.

Polystyrene: 0.2 part
Fluorine-containing graft polymer (GF-300, tradename of Toa Synthetic Chemical Co., Ltd, Japan): 0,005 part
Methyl ethyl ketone 10 parts
cyclohexane 100 parts Thus, a recording medium according to the invention comprising a substrate, an intemediate layer, and the recording layer (comprising In, Au and GeS) superposed on the substrate was prepared.

COMPARISON EXAMPLE 7

The procedures of Example 6 were repeated except for not using Au as the material of the recording layer, whereby forming a recording layer of 300 angstroms thick comprising In and GeS (In content=52.5 wt.%).

Thus, a recording medium comprising a substrate, an intermediate layer and a recording layer arranged in order on the substrate was prepared.

Evaluation of Recording Medium

The recording media prepared in Example 6 and Comparison Example 7 were evaluated with respect to the sensitivity in the manner described above.

The results are set forth in Table 5.

TABLE 5

|  | Example 6 | Comparison Ex. 7 |
|---|---|---|
| Sensitivity (mW) | 6 | 8 |

As is clear from the results in Table 5, a recording medium having a recording layer wherein Au is contained with concentration of gradient increasing toward the surface facing the substrate and a intermediate layer comprising polystyrene and fluorine-containing graft polymer (according to the invention) showed higher recording sensitivity.

EXAMPLE 7

The procedures of Example 5 were repeated except for using a coating solution having the following composition.

Polymethyl methacrylate: 0.2 part
Fluorine-containing graft polymer (GF-300, tradename of Toa Synthetic Chemical Co., Ltd. Japan): 0,005 part
Methyl ethyl ketone: 100 parts Thus, a recording medium according to the invention comprising a substrate, an intemediate layer, and the recording layer (comprising In, Au and GeS) superposed on the substrate was prepared.

COMPARISON EXAMPLE 8

The procedures of Example 7 were repeated except for not providing the intermediate layer and further not using Au as the material of the recording layer, whereby forming a recording layer of 300 angstroms thick comprising In and GeS (In content=52.5 wt.%).

Thus, a recording medium comprising a substrate and a recording layer arranged on the substrate was prepared.

Evaluation of Recording Medium

The recording media prepared in Example 7 and Comparison Example 8 were evaluated with respect to the sensitivity in the manner described above.

The results are set forth in Table 6.

TABLE 6

|  | Example 7 | Comparison Ex. 8 |
|---|---|---|
| Sensitivity (mW) | 6 | 8 |

As is clear from the results in Table 6, a recording medium having a recording layer wherein Au is contained with concentration of gradient increasing toward the surface facing the substrare and a intermediate layer comprising polymethyl methacrylate and fluorine-containing graft polymer (according to the invention) showed higher recording sensitivity.

EXAMPLE 8

On a disc-shaped polycarbonate substrate (outer diameter: 130 mm, inner diameter: 15 mm, thickness 1.2 mm) was coated a coating solution having the following composition by spin coating.

—$C_2H_{4-y}Cl_y)_n$ (chlorinated polyethylene, y=1.7, n=200): 0.2 part
Methyl ethyl ketone: 10 parts
cyclohexane: 100 parts The coated layer was dried to form a chlorinated polyethylene layer having the thickness of 150 angstroms on the substrate.

On the chlorinated polyethylene layer was deposited Au in the form of dots (average diameter 100 angstroms), average distance between adjoining dots 300 angstroms) under the conditions of substrate temperature of 90° C., deposition rate of 1 angstrom/sec and vacuum of $10^{-6}$ torr. On the chlorinated polyethylene layer provided with the Au dots was subsequently co-deposited In and GeS to form a recording layer having thickness of 1,200 angstroms. The contents of Au, In and GeS in the recording layer were 5 wt.%, 65 wt.% and 30 wt.%, respectively.

Thus, a recording medium according to the invention comprising a substrate, a chlorinated polyethylene layer, and the recording layer superposed on the substrate was prepared.

COMPARISON EXAMPLE 9

The procedure of Example 8 was repeated for the formation of a chlorinated polyethylene layer on the substrate.

On the chlorinated polyethylene layer was first formed of Au layer by vaporation under the conditions of substrate temperature of 20° C., deposition rate of 6 angstrom/sec and vacuum of $10^{-5}$ torr. Subsequently, on the Au layer was co-deposited In and GeS to form a In-GeS layer. Thus, a Au layer and a In-GeS layer were superposed to form a double recording layer on the substrate in order. In the double recording layer, the ratio of the amounts of Au, In and GeS was 5 wt.%, 65 wt.% and 30 wt.%, respectively, and the total thickness of the double recording layer was 1,200 angstroms.

Thus, a recording medium comprising a substrate, a chlorinated polyethylene layer, and the double recording layer superposed on the substrate was prepared.

Evaluation of Recording Medium

The recording media prepared in Example 8 and Comparison Example 9 were evaluated with respect to the sensitivity and bit error rate (B.E.R.) in the same manner as described hereinbefore.

The results are set forth in Table 7.

TABLE 7

|  | Recording Power (mW) | C/N (dB) | B.E.R. (a) | B.E.R. (b) |
|---|---|---|---|---|
| Example 8 | 7 | 50 | $10^{-5}$ | $10^{-4}$ |
| Com. Ex. 9 | 8 | 50 | $10^{-2}$ | $10^{-1}$ |

As is clear from the results in Table 7, the information recording medium according to the present invention (Example 8) gave a high C/N ratio at a low recording power. Accordingly, the recording medium of the invention shows a high recording sensitivity. Further, since B.E.R. was extremely low, reduction of the reading error was confirmed. Furthermore, the recording medium of the invention showed little decrease of B.E.R. value even after the storage at 60° C., 90%RH for 30 days. Thus, high durability of the recording medium of the invention was further confirmed.

EXAMPLE 9

On a disc-shaped polycarbonate substrate (outer diameter: 130 mm, inner diameter: 15 mm, thickness 1.2 mm) deposited Au in the form of dots (average diameter 100 angstroms, average distance between adjoining dots 300 angstroms) under the conditions of a substrate temperature of 90° C., deposition rate of 1 angstrom/sec and vacuum of $10^{-6}$ torr. On the substrate provided with the Au dots was subsequently co-deposited In and GeS to form a recording layer having thickness of 1,000 angstroms. The contents of Au, In and GeS in the recording layer were 5 wt.%, 65 wt.% and 30 wt.%, respectively.

Thus, a recording medium according to the invention comprising a substrate and the recording layer superposed on the substrate was prepared.

COMPARISON EXAMPLE 10

On the same substrate as described in Example 9 was first formed of Au layer by vaporation under the conditions of substrate temperature of 20° C., deposition rate of 6 angstrom/sec and vacuum of $10^{-5}$ torr. Subsequently, on the Au layer was co-deposited In and GeS to form an In-GeS layer. Thus, a Au layer and an In-GeS layer were superposed to form a double recording layer on the substrate in order. In the double recording layer, the ratio of the amounts of Au, In and GeS was 5 wt.%, 65 wt.% and 30 wt.%, respectively, and the total thickness of the double recording layer was 1,000 angstroms.

Thus, a recording medium comprising a substrate, a chlorinated polyethylene layer, and the double recording layer superposed on the substrate was prepared.

Evaluation of Recording Medium

The recording media prepared in Example 9 and Comparison Example 10 were evaluated with respect to the sensitivity and bit error rate (B.E.R.) in the same manner as described hereinbefore.

The results are set forth in Table 8.

TABLE 8

|  | Recording Power (mW) | C/N (dB) | B.E.R. (a) | B.E.R. (b) |
|---|---|---|---|---|
| Example 9 | 7 | 50 | $10^{-5}$ | $10^{-5}$ |
| Com. Ex. 10 | 8 | 50 | $10^{-2}$ | $10^{-1}$ |

As is clear from the results in Table 8, the information recording medium according to the present invention (Example 9) gave a high C/N ratio at a low recording power. Accordingly, the recording medium of the invention shows a high recording sensitivity. Further, since B.E.R. was extremely low, reduction of the reading error was confirmed. Furthermore, the recording medium of the invention showed no decrease of B.E.R. value even after the storage at 60° C., 90%RH for 30 days. Thus, high durability of the recording medium of the invention was further confirmed.

We claim:

1. In an information recording medium comprising a substrate, an intermediate layer arranged on the substrate, and a recording layer arranged on the intermediate layer, said recording layer comprising a low melting metal selected from the group consisting of In, Te, Sn, Pb and Bi and a metal compound selected from a metal sulfide, a metal fluoride and a metal oxide, the improvement wherein:

the recording layer further contains a metal having a high surface tension of not less than 600 dyne/cm within temperatures from its melting point to a temperature higher than the melting point by 300° C., the concentration of said metal varying along the depth direction of the recording layer in such manner that the concentration of said metal on the side facing the substrate is higher than that of said metal on the opposite side, and the intermediate layer comprises a compound selected from the group consisting of a chlorinated polyolefin, a polymer material having a thermal decomposition temperature of not higher than 300° C., and an organic compound having a surface energy of not higher than 40 dyne/cm².

2. The information recording medium claimed in claim 1, wherein said metal having a high surface tension is selected from the group consisting of Ag, Al, Co, Cu, Ga, Mo, Ni, Si, V, Au, Be, Cr, Fe, Mn, Nb, Pd, Ti and Zn.

3. The information recording medium claimed in claim 1, wherein said metal having a high surface tension is Au.

4. The information recording medium claimed in claim 1, wherein said metal having a high surface tension is contained in the recording layer in an amount of 0.1 to 30 wt.% per the total amount of the recording layer.

5. The information recording medium claimed in claim 1, wherein the concentration of said metal having a high surface tension at the surface in contact with the intermediate layer is in the range of 10 to 70 wt.%.

6. The information recording medium claimed in claim 1, wherein the intermediate layer comprises chlorinated polyethylene, chlorinated polypropylene, and polystyrene.

7. The information recording medium claimed in claim 1, wherein said intermediate layer comprises a chlorinated polyolefin having a chlorination ratio of more than 30%.

8. In an information recording medium comprising a substrate and a recording layer arranged on the substrate, said recording layer comprising a low melting metal selected from the group consisting of In, Te, Sn, Pb and Bi and a metal compound selected from GeS, a metal fluoride and a metal oxide, the improvement wherein:

the recording layer further contains a metal having a high surface tension of not less than 600 dyne/cm within temperatures from its melting point to a temperature higher than the melting point of 300° C., said high surface tension metal being arranged in the form of islands on the surface facing the substrate.

9. The information recording medium as claimed in claim 8, wherein an intermediate layer is provided between the substrate and the recording layer.

10. The information recording medium as claimed in claim 8, wherein an intermediate layer comprises a compound selected from the group consisting of a chlorinated polyolefin, a polymer material having a thermal decomposition temperature of not higher than 300° C., and an organic compound having a surface energy of not higher than 40 dyne/cm² is provided between the substrate and the recording layer.

11. The information recording medium claimed in claim 8, wherein said metal having a high surface tension is selected from the group consisting of Ag, Al, Co, Cu, Ga, Mo, Ni, Si, V, Au, Be, Cr, Fe, Mn, Nb, Pd, Ti and Zn.

12. The information recording medium claimed in claim 8, wherein said metal having a high surface tension is Au.

13. The information recording medium claimed in claim 8, wherein said metal having a high surface tension is contained in the recording layer in an amount of 0.1 to 30 wt.% per the total amount of the recording layer.

14. The information recording medium claimed in claim 8, wherein said islands of the metal having a high surface tension are in the form of dots having a mean diameter of 20 to 500 angstroms and distances between adjoining dots ranges from 50 to 1,000 angstroms.

15. The information recording medium claimed in claim 8, wherein the intermediate layer comprising a polymer selected from the group consisting of chlorinated polyethylene, chlorinated polypropylene, and polystyrene is provided between the substrate and the recording layer.

16. The information recording medium claimed in claim 8, wherein the intermediate layer comprising a chlorinated polyolefin having a chlorination ratio of more than 30% is provided between the substrate and the recording layer.

* * * * *